(12) United States Patent
Stevens (10) Patent No.: US 9,628,893 B2
(45) Date of Patent: Apr. 18, 2017

(54) METHOD OF AUTO-PAUSING AUDIO/VIDEO CONTENT WHILE USING HEADPHONES

(71) Applicant: EchoStar Technologies L.L.C., Englewood, CO (US)

(72) Inventor: Gerald Robert Stevens, Cheyenne, WY (US)

(73) Assignee: EchoStar Technologies, L.L.C., Englewood, CO (US)

( * ) Notice: Subject to any disclaimer, the term of this patent is extended or adjusted under 35 U.S.C. 154(b) by 16 days.

(21) Appl. No.: 14/721,607

(22) Filed: May 26, 2015

(65) Prior Publication Data

US 2016/0353194 A1    Dec. 1, 2016

(51) Int. Cl.
*H04R 29/00*    (2006.01)
*H04R 1/10*    (2006.01)
*H04W 4/20*    (2009.01)
*G06F 3/16*    (2006.01)
*G10L 15/26*    (2006.01)

(52) U.S. Cl.
CPC .......... *H04R 1/1041* (2013.01); *G06F 3/165* (2013.01); *G10L 15/26* (2013.01); *H04R 29/00* (2013.01); *H04W 4/20* (2013.01)

(58) Field of Classification Search
CPC ....... H04R 1/1041; H04R 29/00; G06F 3/165; G10L 15/26; H04W 4/20
See application file for complete search history.

(56) References Cited

U.S. PATENT DOCUMENTS

2013/0236027 A1* 9/2013 Tao ................... H04W 52/0241
381/74

\* cited by examiner

*Primary Examiner* — Muhammad N Edun
(74) *Attorney, Agent, or Firm* — Seed Intellectual Property Law Group LLP (57) ABSTRACT

A headset includes at least one earpiece, at least one speaker coupled to the at least one earpiece, at least one sensor, and control circuitry. The at least one sensor, in operation, detects whether the at least one earpiece is abutting at least one ear of a person and outputs at least one sensor signal indicating whether the at least one earpiece is abutting the at least one ear of the person. The control circuitry, in operation, receives the at least one sensor signal from the at least one sensor, and causes at least one control signal to be provided to an external device responsive to detecting at least one change in a state of the at least one sensor signal from the at least one sensor. The at least one control signal is configured to cause the external device to pause or un-pause playing of content.

15 Claims, 8 Drawing Sheets

METHOD OF AUTO-PAUSING AUDIO/VIDEO CONTENT WHILE USING HEADPHONES

BACKGROUND

Technical Field

The present disclosure relates to audio headphones (i.e., headsets), and more particularly to automatically pausing audio/video content being played on an audio/video device that is coupled to headphones when the headphones are moved away from a user's ears.

Description of the Related Art

Conventional audio headphones may provide one or more signals to a device that is connected to the audio headphones. For example, EarPod™ headphones sold by Apple, Inc. include a button that, when actuated, causes a device connected to the EarPod™ headphones to pause content that is playing or to un-pause (i.e., resume playing) content that is paused. Such a button may be useful if a user wishes to pause a movie that is being displayed on the user's smartphone before the user removes her headphones to participate in a conversation, and to resume the movie at the conclusion of the conversation after the user has placed the headphones back on her head. However, the user must remember to actuate the button to pause the movie before she removes her headphones at the beginning of the conversation, or she will miss part of the movie while participating in the conversation.

Accordingly, there is a need for headphones that automatically cause audio and/or video content provided by a content playing device to be paused when a user removes headphones that are connected to the device. Additionally, there is a need for headphones that automatically cause the content playing device to resume playing of the audio and/or video content after the user puts the headphones back on her head.

BRIEF SUMMARY

In one embodiment, a method of controlling playing of content from a device coupled to a headset may include detecting whether at least one earpiece of the headset is abutting a person's head adjacent to one ear of a person. The method also may include generating a first control signal configured to cause the device to permit playing of the content, responsive to detecting that the at least one earpiece of the headset is abutting the person's head, and providing the first control signal to the device. The method also may include permitting the playing of the content, responsive to receiving the first control signal. The method also may include generating a second control signal configured to cause the device to permit pausing of the content, responsive to detecting that the at least one earpiece of the headset is not abutting the person's head, and providing the second control signal to the device. The method also may include permitting the pausing of the content, responsive to receiving the first control signal. The method also may include muting or un-muting a speaker coupled to the earpiece. The method also may include generating at least one control signal that causes the device to pause playing of the content, responsive to detecting an occurrence of an event in an environment in which the headset is located.

In another embodiment, a headset is provided. The headset may include at least one earpiece and at least one speaker coupled to the at least one earpiece. The headset also may include at least one sensor, which in operation, detects whether the at least one earpiece is abutting at least one ear of a person and outputs at least one sensor signal indicating whether the at least one earpiece is abutting the at least one ear of the person. The headset also may include control circuitry, which in operation, receives the at least one sensor signal from the at least one sensor and causes at least one control signal to be provided to an external device responsive to detecting at least one change in a state of the at least one sensor signal from the at least one sensor, the at least one control signal configured to cause the external device to terminate playing of content. The control circuitry, in operation, may cause the at least one speaker to be muted or un-muted based on the at least one sensor signal from the at least one sensor. The headset also may an audio sensor, which in operation, outputs to the control circuitry an audio signal corresponding to at least one sound in an environment in which the audio sensor is located, wherein the control circuitry, in operation, provides to the external device a control signal configured to cause the external device to pause playing of content based on a state of the audio signal.

DETAILED DESCRIPTION

Figure 1:
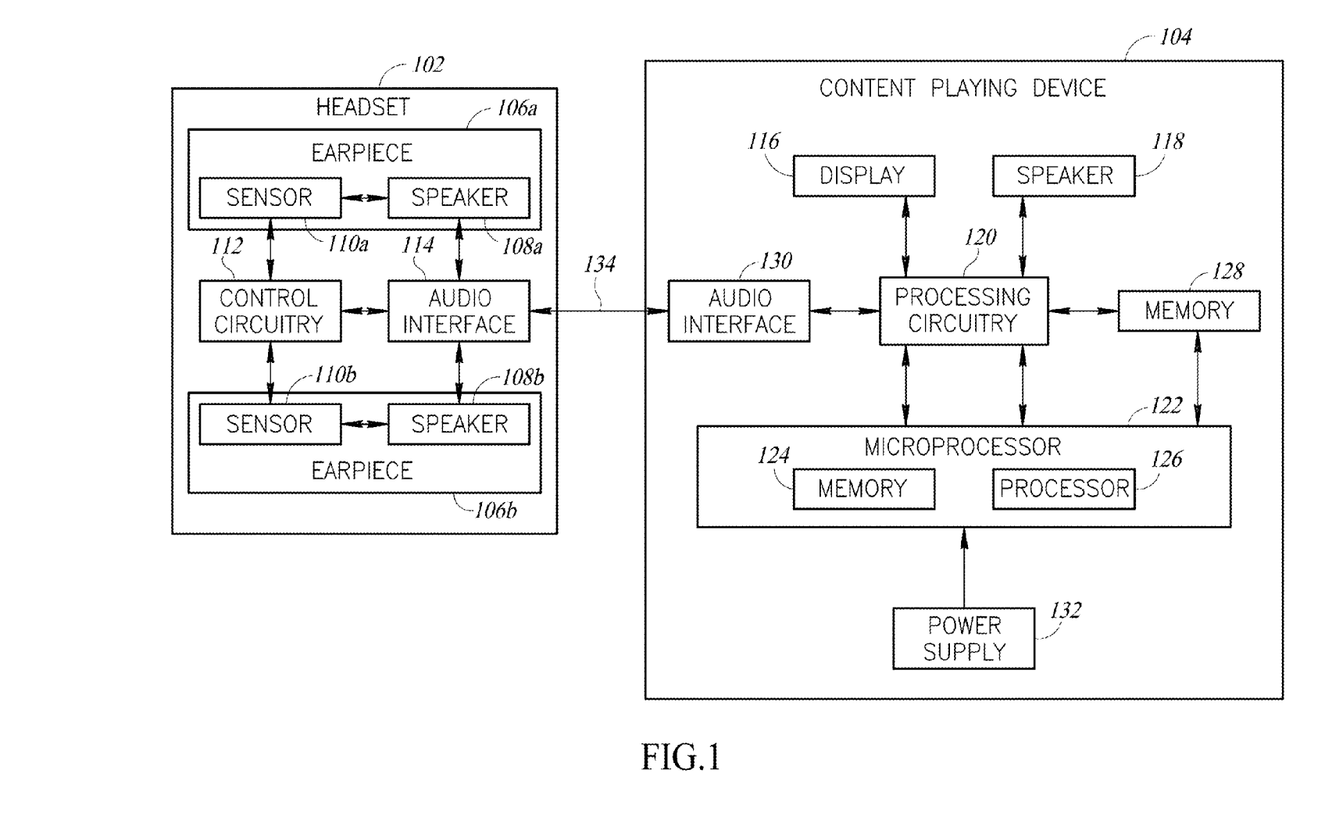
FIG. 1 is a block diagram of a system according to one embodiment of the present disclosure.

FIG. 1 is a block diagram of a system 100 according to one embodiment of the present disclosure. The system 100 includes a headset 102 and a content playing device 104. In one embodiment, the content playing device 104 is a smartphone.

The headset 102 includes a first earpiece 106a and a second earpiece 106b. The first earpiece 106a includes a speaker 108a and a sensor 110a. Similarly, the second earpiece 106b includes a speaker 108b and a sensor 110b. In one embodiment, the headset includes only the first earpiece 106a. In one embodiment, the first earpiece 106a does not include the sensor 110a and/or the second earpiece 106b does not include the sensor 110b. In one embodiment, the headset 102 further includes a headband (not shown) to which the first earpiece 106a and the second earpiece 106b are attached, and the sensor 110a and/or the sensor 110b is provided on the headband. In one embodiment, the headset 102 further includes a microphone (not shown).

The sensors 110a and 110b may be of one or more types. For example, at least one of the sensors 110a and 110b may be a pressure sensor, a toggle switch, a capacitive sensor, a proximity sensor, a temperature sensor, an acoustic sensor, or a combination thereof.

In one embodiment, at least one of the sensors 110a and 110b is a conventional pressure sensor, which in operation, outputs a first signal (or no signal) when a force less than a predetermined magnitude is applied to a portion of the sensor and that outputs a second signal when a force greater than or equal to the predetermined magnitude is applied to the portion of the sensor.

In one embodiment, at least one of the sensors 110a and 110b is a conventional toggle switch, which in operation, outputs a first signal (or no signal) when a portion of the switch is in a first position, and that outputs a second signal when the portion of the switch is in a second position.

In one embodiment, at least one of the sensors 110a and 110b is a capacitive sensor, which in operation, outputs a first signal (or no signal) when a portion of the capacitance sensor senses a capacitance of human skin, and that outputs a second signal when the portion of the capacitance sensor does not sense a capacitance of human skin.

In one embodiment, at least one of the sensors 110a and 110b is a conventional proximity sensor (e.g., optical or acoustic), which in operation, outputs a first signal (or no signal) when a portion of the sensor senses an object within a predetermined distance from the proximity sensor, and that outputs a second signal when the portion of the sensor does not sense an object within the predetermined distance from the proximity sensor.

In one embodiment, at least one of the sensors 110a and 110b is a conventional thermal sensor, which in operation, outputs a first signal (or no signal) when a portion of the thermal sensor senses a temperature that is not within a predetermined range, and that outputs a second signal when the portion of the thermal sensor senses a temperature that is within the predetermined range.

In one embodiment, at least one of the sensors 110a and 110b is a conventional acoustic sensor, which in operation, outputs a signal indicative of a sound sensed by a portion of the acoustic sensor.

The sensors 110a and 110b, in addition to being various types of sensors such as optical, infrared, radio, acoustic, or other proximity sensors, may also have, in some embodiments, different sensitivity for detecting whether they are adjacent to an ear. In the simplest embodiment, they are merely pressure sensors which indicate that a pressure is being applied against the sensor. Thus, if the pressure sensor is directly abutting a portion of the human head, whether the temple, immediately in front of the ear, the inside of the ear, or a physical part of the ear, the pressure sensor indicates that it is abutting another object and, therefore, outputs the signal that permits operation of the playing of the content and audio output from the speakers 108. Such simple pressure sensors are low in cost and output signals responsive to being touched or having a slight pressure applied physically to them by being in contact with another object.

Alternatively, the sensors 110a and 110b can be of a more sophisticated nature and sense that they are actually adjacent to a human ear. For example, they may be optical and be fine tuned to determine the characteristics of an ear as opposed to some other part of the human body. For example, the ear is generally permeable to light whereas the skull and the temple are not. The sensors may indicate that they are directly adjacent to tissue which is fairly thin and light permeable and, thus, indicate that they are adjacent to an ear of a human as compared to resting merely against the back of the head, the top of the head, or the temple of a person. With sensors 110a and 110b of the type that is fine tuned to recognize an ear, this would permit a user to put a portion of the headset resting against a part of his head or shoulder and indicate that the playing of the content should be paused, since it is not adjacent to the ear. A temperature sensor provides a similar benefit in that it would require that it be closely adjacent to the human body that is emitting an infrared frequency characteristic of the skin of a person. Thus, the temperature sensor may be of a type of infrared sensor and may not require that it specifically determine the actual temperature of a person.

The headset 102 also includes control circuitry 112 that is coupled to an audio interface 114 and to the sensors 110a and 110b. The control circuitry 112 receives sensor signals from the sensors 110a and 110b, and provides a control signal to the audio interface 114. In one embodiment, the audio interface 114 includes connectors corresponding to a conventional audio jack connector of a type typically found in portable electronic devices. For example, the audio interface 114 includes connectors corresponding to a standard 3.5 mm audio jack, which includes four connectors including a left channel connector, a right channel connector, a microphone connector, and a ground connector. In the embodiment shown in FIG. 1, one or more connectors included in the audio interface 114 provide power for operating the sensors 110a and 110b and the control circuitry 112.

In one embodiment, the control circuitry 112 includes an audio tone generator (not shown) having at least one input terminal electrically coupled to at least one output terminal of at least one of the sensors 110a and 110b. In response to receiving from at least one of the sensors 110a and 110b at least one sensor signal having at least one predetermined characteristic (e.g., voltage level, frequency, duration, etc.), the audio tone generator outputs a first audio signal having at least one predetermined characteristic (voltage level, frequency, duration, etc.) from an output terminal that is electrically coupled to a microphone connector of the audio interface 114. When the at least one of the sensors 110a and 110b stops outputting the at least one sensor signal, the audio tone generator stops outputting the first audio signal, and may output a second audio signal having at least one predetermined characteristic (e.g., voltage level, frequency, duration, etc.) different from that of the first audio signal.

In one embodiment, the control circuitry 112 includes one or more switches (not shown) that are operable by a user to change the manner in which the control circuitry 112 operates. For example, the control circuitry 112 includes a first switch that changes a number of the sensors 110a and 110b that provide sensor signals to other components of the control circuitry 112. When the first switch is in one position, sensor signals provided by both of the sensors 110a and 110b are used to determine whether the control circuitry 112 provides a control signal to the audio interface 114, to indicate to the content playing device 104 that content being played is to be paused. When the first switch is in another position, a sensor signal provided by only a selected one of the sensors 110a and 110b is used to determine whether the control circuitry 112 provides the control signal to the audio interface 114, to indicate to the content playing device 104 that content being played is to be paused. Additionally, the control circuitry 112 includes a second switch that changes a number of the sensors 110a and 110b that provide sensor signals to other components of the control circuitry 112. When the second switch is in one position, sensor signals provided by both of the sensors 110a and 110b are used to determine whether the control circuitry 112 provides a control signal to the audio interface 114, to indicate to the content playing device 104 that content being paused is to be un-paused (i.e., played). When the second switch is in another position, a sensor signal provided by only a selected one of the sensors 110a and 110b is used to determine whether the control circuitry 112 provides the control signal to the audio interface 114, to indicate to the content playing device 104 that content being paused is to be un-paused.

The content playing device 104 may be a smartphone, tablet computer, or media player, for example. The content playing device 104 includes a display 116, at least one speaker 118, processing circuitry 120, a microprocessor 122 having a memory 124 and a processor 126, a memory 128, and an audio interface 130. In one embodiment, the memory 124 is volatile memory (e.g., Random Access Memory (RAM) and the memory 128 is non-volatile memory (e.g., Flash memory or an Electronically Erasable Programmable Read-Only Memory (EEPROM)). Although a power supply 132 (e.g., a battery) is shown coupled to only the microprocessor 122, the power supply 132 is coupled to and supplies power for operating the display 116, the processing circuitry 120, the microprocessor 122, and the memory 128. An audio cable 134 interconnects the audio interface 114 of the headset 102 and the audio interface 130 of the content playing device 104. In one embodiment, the audio cable 134 is part of the headset 102.

In one embodiment, the display 116 is a conventional touchscreen display that outputs signals in response to a user performing input operations on the display 116. The signals output from the display 116 are provided to the microprocessor 122 via the processing circuitry 120. The memory 124 and/or the memory 128 stores processor executable instructions that, when executed by the processor 126, cause the microprocessor 122 to control operation of the content playing device 104. The instructions cause the microprocessor 122 to control the content playing device 104 such that content stored in the memory 128 is played via the display 116 and the speaker 118, in response to predetermined user operations input via the display 116.

For example, when a user specifies via the display 116 that a particular movie is to be played, the microprocessor 122 causes data corresponding to the movie to be transferred from the memory 128 to the processing circuitry 120. The microprocessor 122 also causes one or more audio or video decoders (e.g., mp3 and/or mp4 decoders) included in the processing circuitry 120 to decode the data and to provide corresponding video signals to the display 116 and corresponding audio signals to the audio interface 130, when the audio cable 134 is connected to the audio interface 130.

The processing circuitry 120 includes a first circuit (not shown) that monitors the state of connectors of the audio interface 130 and that provides corresponding signals to the microprocessor 122. For example, the first circuit may include a detector that detects when a control signal having at least one predetermined characteristic is received from the headset 102 via a microphone connector of the audio interface 130. In response to detecting the control signal, the first circuit causes the processing circuitry 120 to output a signal to the microprocessor 122, which causes the microprocessor 122 to control the processing circuitry 120 to pause (i.e., at least temporarily stop playing in a manner that can be resumed) content that is currently being played.

The processing circuitry 120 also includes a second circuit (not shown) that monitors the state of connectors of the audio interface 130 and provides corresponding signals to the microprocessor 122. For example, the second circuit may include a detector that detects when the control signal having at least one predetermined characteristic is no longer being received (or when a different signal is being received) from the headset 102 via the microphone connector of the audio interface 130. In response to detecting that the control signal is no longer being provided (or that a different control signal is being provided), the second circuit causes the processing circuitry 120 to output to the microprocessor 122 a signal that causes the microprocessor 122 to control the processing circuitry 120 to un-pause (i.e., resume playing) the content that is currently being paused.

Figure 2:
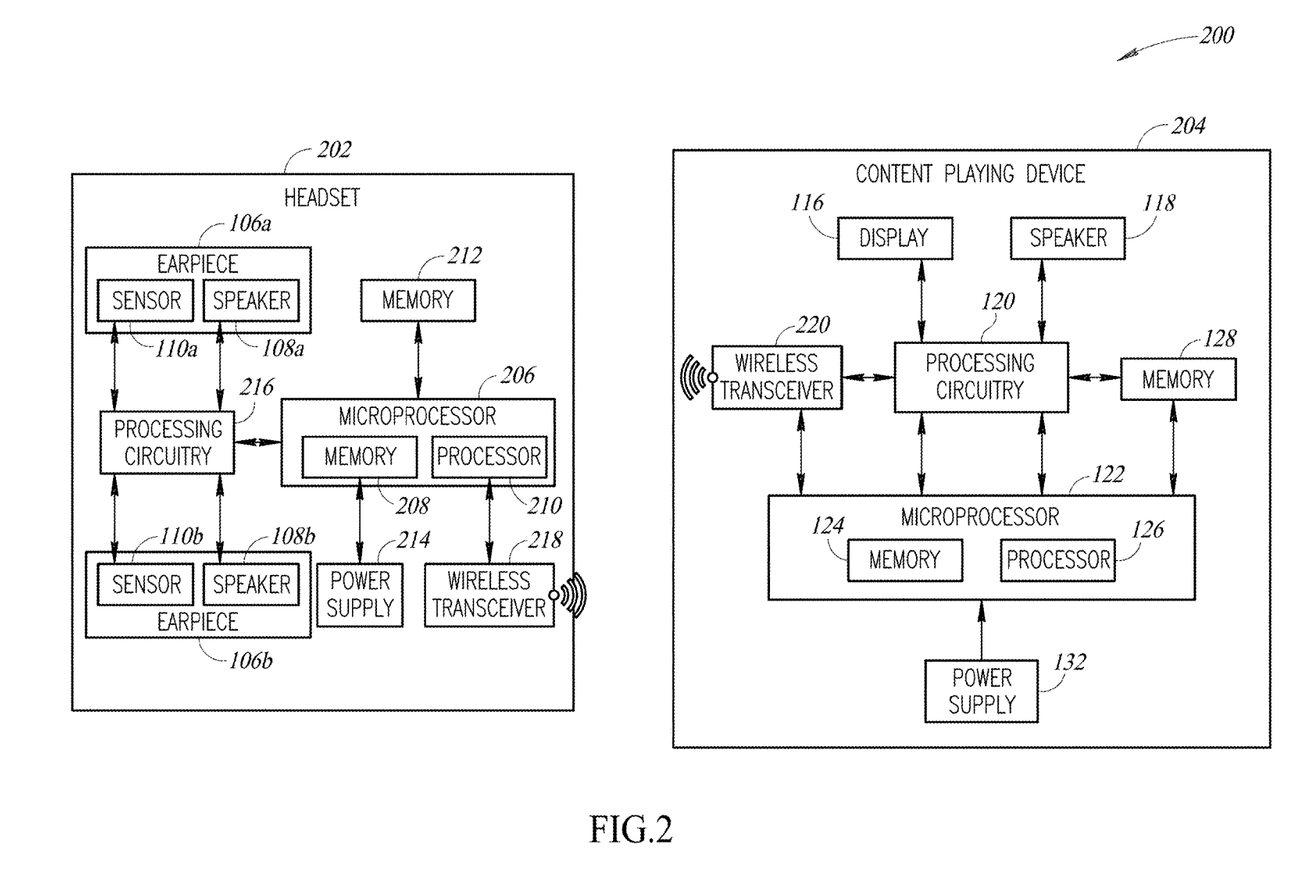
FIG. 2 is a block diagram of a system according to one embodiment of the present disclosure.

FIG. 2 is a block diagram of a system 200 according to one embodiment of the present disclosure. The system 200 includes a headset 202 and a content playing device 204. The system 200 is similar in many relevant respects to the system 100 shown in FIG. 1, except that the headset 202 and the content playing device 204 communicate wirelessly. For example, the headset 202 and the content playing device 204 communicate wirelessly according to the Bluetooth or the IEEE 802.11 communication standards.

The headset 202 includes the first earpiece 106a and the second earpiece 106b. The first earpiece 106a includes the speaker 108a and the sensor 110a. Similarly, the second earpiece 106b includes the speaker 108b and the sensor 110b. The sensors 110a and 110b may include any of the types of sensors described above in connection with the headset 102.

In one embodiment, the headset 202 includes only the first earpiece 106a. In one embodiment, the first earpiece 106a does not include the sensor 110a and/or the second earpiece 106b does not include the sensor 110b. In one embodiment, the headset 202 further includes a headband (not shown) to which the first earpiece 106a and the second earpiece 106b are attached, and the sensor 110a and/or the sensor 110b is provided on the headband. In one embodiment, the headset 202 further includes a microphone (not shown).

The headset 202 also includes processing circuitry 216 that is coupled to control circuitry including a microprocessor 206 and is coupled to the sensor 110a and the sensor 110b. The processing circuitry 216 receives sensor signals output from the sensors 110a and 110b, and outputs signals to the microprocessor 206 and to the speakers 108a and 108b. The microprocessor 206 includes a memory 208 and a processor 210, and is coupled to a memory 212. In one embodiment, the memory 208 is volatile memory (e.g., Random Access Memory (RAM) and the memory 212 is non-volatile memory (e.g., Flash memory or EEPROM). The memory 208 and/or the memory 212 stores processor executable instructions that, when executed by the processor 210, cause the microprocessor 206 to control operation of the headset 202. Although a power supply 214 (e.g., a battery) is shown coupled to only the microprocessor 206, the power supply 214 is coupled to and supplies power for operating the microprocessor 206, the processing circuitry 216, the memory 212, and a wireless transceiver 218.

The instructions cause the microprocessor 206 to control the headset 202 such that the headset 202 wirelessly connects with the content playing device 204, receives content data from the content playing device 204, processes the content data, outputs corresponding signals that are provided to the speakers 108a and 108b, and provides control signals to the content playing device 204. More particularly, the processing circuitry 216 includes one or more audio decoders (e.g., mp3) that receive control signals and content data from the microprocessor 206 and that output corresponding audio signals to the speakers 108a and 108b. The processing circuitry 216 also includes one or more circuits that receive sensor signals from the sensors 110a and 110b, and that output one or more control signals to the microprocessor 206. For example, such circuits receive sensor signals from the sensors 110a and 110b and output control signals to the microprocessor 206 indicating that the earpieces 106a and 106b are located near a user's ears or are partially inserted into the user's ears. The processor 210 executes processor executable instructions that cause the microprocessor 206 to control the wireless transceiver 218 such that the wireless transceiver 218 transmits control signals to the content playing device 204.

For example, when at least one of the sensors 110a and 110b provides at least one sensor signal indicating that at least one of the earpieces 106a and 106b is close to at least one of a user's ears, the microprocessor 206 determines whether the processing circuitry 216 is outputting audio signals to the speakers 108a and 108b. If so the microprocessor 206 causes data to be stored in the memory 208 and/or the memory 212 indicating that the headset 202 is currently being worn by the user and is outputting audio signals from the speakers 108a and 108b. When at least one of the sensors 110a and 110b provides at least one sensor signal indicating that at least one of the earpieces 106a and 106b is no longer close to at least one of the user's ears, the microprocessor 206 controls the memory 208 and/or the memory 212 to store data indicating that the speakers 108a and 108b are outputting audio signals and at least one of the speakers 108a and 108b is no longer close to at least one of the user's ears. Additionally, the microprocessor 206 sends control signals to the wireless transceiver 218 that cause the transceiver 218 to output a first control signal that is configured to cause the content playing device 204 to pause playing of content. When at least one of the sensors 110a and 110b provides at least one sensor signal indicating that at least one of the earpieces 106a and 106b is once again close to at least one of the user's ears, the microprocessor 206 controls the wireless transceiver 218 to output a second control signal that is configured to cause the content playing device 204 to un-pause playing of content.

The content playing device 204 shown in FIG. 2 is similar in many relevant respects to the content playing device 104 shown in FIG. 1, except that the content playing device 204 communicates wirelessly with the headset 202. The content playing device 204 includes the display 116, the at least one speaker 118, the processing circuitry 120, the microprocessor 122 having the memory 124 and the processor 126, the memory 128, and a wireless transceiver 220 that communicates wirelessly with the wireless transceiver 218 of the headset 202. In one embodiment, the memory 124 is volatile memory (e.g., Random Access Memory (RAM) and the memory 128 is non-volatile memory (e.g., Flash memory or EEPROM). The memory 124 and/or the memory 128 stores processor executable instructions that, when executed by the processor 126, cause the microprocessor 122 to control operation of the content playing device 204.

For example, the instructions cause the microprocessor 122 to control the content playing device 204 such that data corresponding to user specified content is transferred from the memory 128 to the processing circuitry 120, which includes one or more audio and/or video decoders (e.g., mp3 and/or mp4 decoders). The microprocessor 122 also controls the processing circuitry 120 to output a video portion of the content to the display 116 and to output an audio portion of the content to the speaker 118 or to the microprocessor 122, which puts data corresponding to the audio portion into data packets for transmission to the headset 202. Additionally, the microprocessor 122 controls the wireless transceiver 220 to transmit the data packets to the headset 202 via a wireless connection. In addition, the microprocessor 122 processes control packets received by the wireless transceiver 220. If a control packet includes an instruction to pause playing of the content, the microprocessor 122 controls the processing circuitry 120 to stop outputting the video portion of the content to the display 116 and to stop outputting the audio portion of the content to the microprocessor 122. If a control packet includes an instruction to un-pause playing of the content, the microprocessor 122 controls the processing circuitry 120 to resume outputting the video portion of the content to the display 116 and to resume outputting audio data corresponding to the audio portion of the content to the microprocessor 122, which controls the wireless transceiver 220 to transmit the audio portion to the headset 202.

Figure 3:
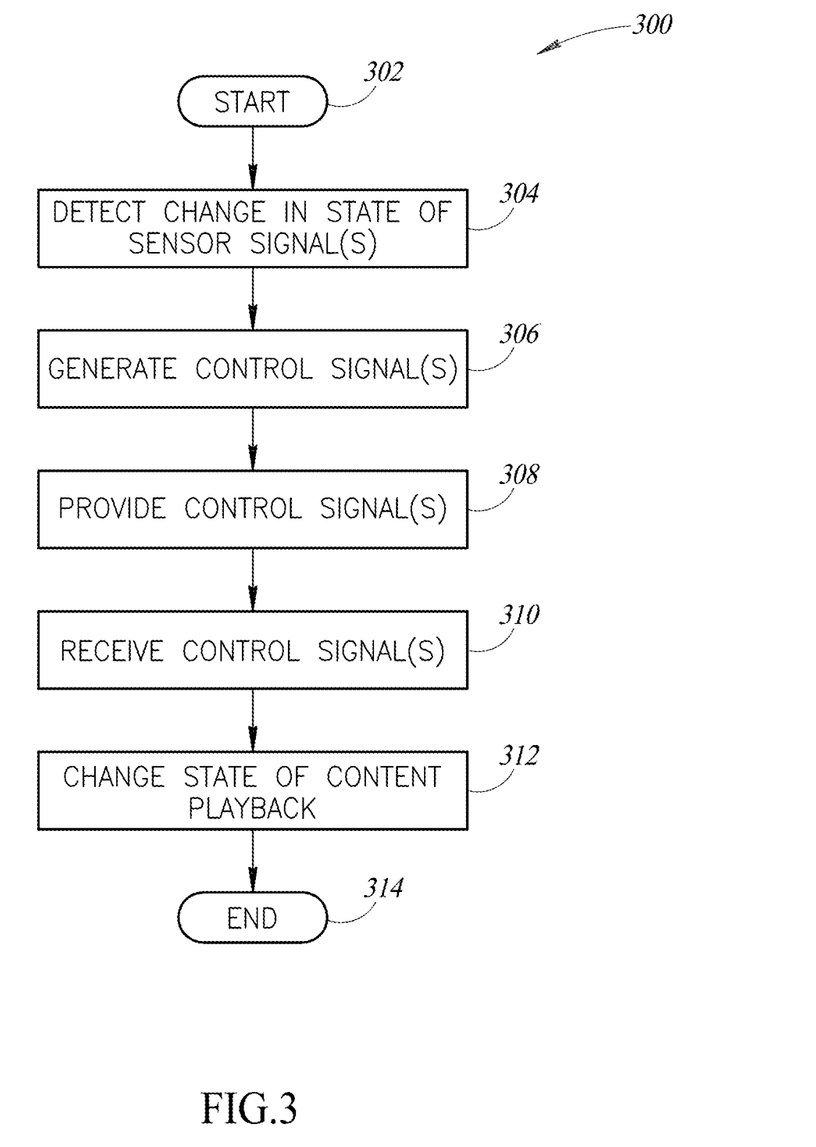
FIG. 3 is a flowchart of a process according to one embodiment of the present disclosure.

FIG. 3 is a flowchart 300 illustrating a process performed by a system according to one embodiment of the present disclosure. In one embodiment, the process is performed by the system 100 including the headset 102 and the content playing device 104 shown in FIG. 1. In one embodiment, the process is performed by the system 200 including the headset 202 and the content playing device 204 shown in FIG. 2.

The process begins at 302. At 304, a headset detects at least one change in at least one state of at least one sensor signal. In one embodiment, at 304, the control circuitry 112 of the headset 102 detects a change in the state of at least one sensor signal provided by at least one of the sensors 110a and 110b. For example, the control circuitry 112 of the headset 102 detects that at least one sensor signal provided by at least one of the sensors 110a and 110b transitions from a high voltage level to a low voltage level, transitions from a low voltage level to a high voltage level, transitions from no signal to a signal, or transitions from a signal to no signal.

In one embodiment, at 304, the microprocessor 206 and/or the processing circuitry 216 of the headset 202 detects a change in the state of at least one sensor signal provided by at least one of the sensors 110a and 110b. For example, the microprocessor 206 and/or the processing circuitry 216 of the headset 202 detects that at least one sensor signal provided by at least one of the sensors 110a and 110b transitions from a high voltage level to a low voltage level, transitions from a low voltage level to a high voltage level, transitions from no signal to a signal, or transitions from a signal to no signal.

In one embodiment, the processing circuitry 216 of the headset 202 includes an audio sensor and the microprocessor 206, in operation, detects an occurrence of an event in an environment in which the headset 202 is located based on audio data generated by the audio sensor. For example, the microprocessor 206 detects when a user's telephone is ringing or when the user's name has been spoken. The audio sensor generates audio data that is provided to the microprocessor 206, which determines whether an audio signal corresponding to the audio data has at least one characteristic (e.g., pitch, frequency, tone, duration) that is the same as that of the ringer of the user's telephone. This feature may be particularly useful in an office environment in which a user is working while wearing the headset 202 because the playing of the content is paused when the user's office telephone rings. In such an embodiment, the headset 202 may include user controls (e.g., switches) for setting characteristics of the sound (e.g., type of telephone ring) and/or a communication port (e.g., universal serial bus (USB) interface) for receiving data specifying characteristics of the sound (e.g., frequency, pitch, tone).

In one embodiment, the microprocessor 206 of the headset 202 converts the audio data to first text data and then compares the first text data to second text data that is stored in the memory 208 and/or the memory 212. The second text data may include the name of a user, for example. The microprocessor 206 then compares the first text data to the second text data and determines that a particular event has occurred if the first text data at least partially matches the second text data. For example, if the second text data includes the name of a user, the microprocessor 206 determines that someone is attempting to speak with the user. As explained in detail below, the microprocessor 206 can generate a control signal that causes the content playing device 204 to pause playing of content, so that the user can hear the person who is attempting to speak with the user. This feature may be particularly useful in an office environment in which a user is working while wearing the headset 202 because the playing of the content is paused if a coworker attempts to speak with the user or if the user is paged over an intercom system.

At 306, the headset generates one or more control signals based on the change(s) in state(s) of the sensor signal(s) detected at 304. In one embodiment, the control circuitry 112 of the headset 102 includes an audio tone generator that generates a control signal having at least one predetermined characteristic (e.g., frequency, duration, voltage level), in response to detecting a change in the state of the sensor signal output from the sensor 110a.

In one embodiment, the control circuitry 112 of the headset 102 includes switches (not shown) through which signals from the audio interface 114 pass before being provided to the speakers 108a and 108b. If the control circuitry 112 determines at 304 that only one of the sensor signals provided by the sensors 110a and 110b has changed, the control circuitry 112 may cause one of the switches to open, to mute one of the speakers 108a and 108b. For example, if the control circuitry 112 detects that only the sensor signals provided by the sensor 110a has changed at 304, the control circuitry 112 generates at 306 a control signal that causes a switch to open so that the speaker 108a is muted. This feature may be particularly useful if a user has pulled only the earpiece 106a away from her ear so that she can hear sounds in the environment around her.

In one embodiment, the microprocessor 122 of the headset 202 generates a control packet at 306 that includes control information or an instruction that, when processed by the content playing device 204, causes the content playing device 204 to pause playing of content, in response to detecting at 304 a change in the state of the sensor signal output from the sensor 110a and a change in the state of the sensor signal output from the sensor 110b.

At 308, the headset provides the one or more control signals generated at 306 to a component, for example, of an external device. In one embodiment, at 308, the control circuitry 112 of the headset 102 provides a control signal generated at 306 to at least one connector included in the audio interface 114, which is connected via the audio cable 134 to the content playing device 104. The audio cable 134 provides the control signal to the content playing device 104. In one embodiment, at 308, the microprocessor 122 of the headset 202 provides a control packet generated at 306 to the wireless transceiver 218, which is connected via a wireless connection to the content playing device 204. The wireless transceiver 218 provides the control packet to the content playing device 204 via the wireless connection.

At 310, a component, for example, of an external device receives the one or more control signals provided at 308. In one embodiment, at 310, the audio interface 130 of the content playing device 104 receives the one or more control signals from the headset 102 via the audio cable 134. In one embodiment, at 310, the processing circuitry 120 of the content playing device 104 receives the one or more control signals from the audio interface 130. In one embodiment, at 310, the microprocessor 122 of the content playing device 104 receives the one or more control signals from the processing circuitry 120 or the audio interface 130.

In one embodiment, at 310, the wireless transceiver 220 of the content playing device 204 receives the one or more control signals from the headset 202 via a wireless connection. In one embodiment, at 310, the processing circuitry 120 receives the one or more control signals from the wireless transceiver 220. In one embodiment, at 310, the microprocessor 122 receives the one or more control signals from the processing circuitry 120 or the wireless transceiver 220.

At 312, the headset or the external device changes a state of content playing. In one embodiment, at 312, the microprocessor 122 of the content playing device 104 provides at least one control signal to the processing circuitry 120, in response to the one or more control signals received at 310. As a result, the processing circuitry 120 stops outputting a video portion of the content to the display 116 and stops outputting an audio portion of the content to the audio interface 130.

In one embodiment, at 312, the microprocessor 122 of the content playing device 204 provides at least one control signal to the processing circuitry 120, in response to the one or more control signals received at 310. As a result, the processing circuitry 120 stops outputting a video portion of the content to the display 116 and stops outputting an audio portion of the content to the microprocessor 122. The process ends at 314.

Figure 4:
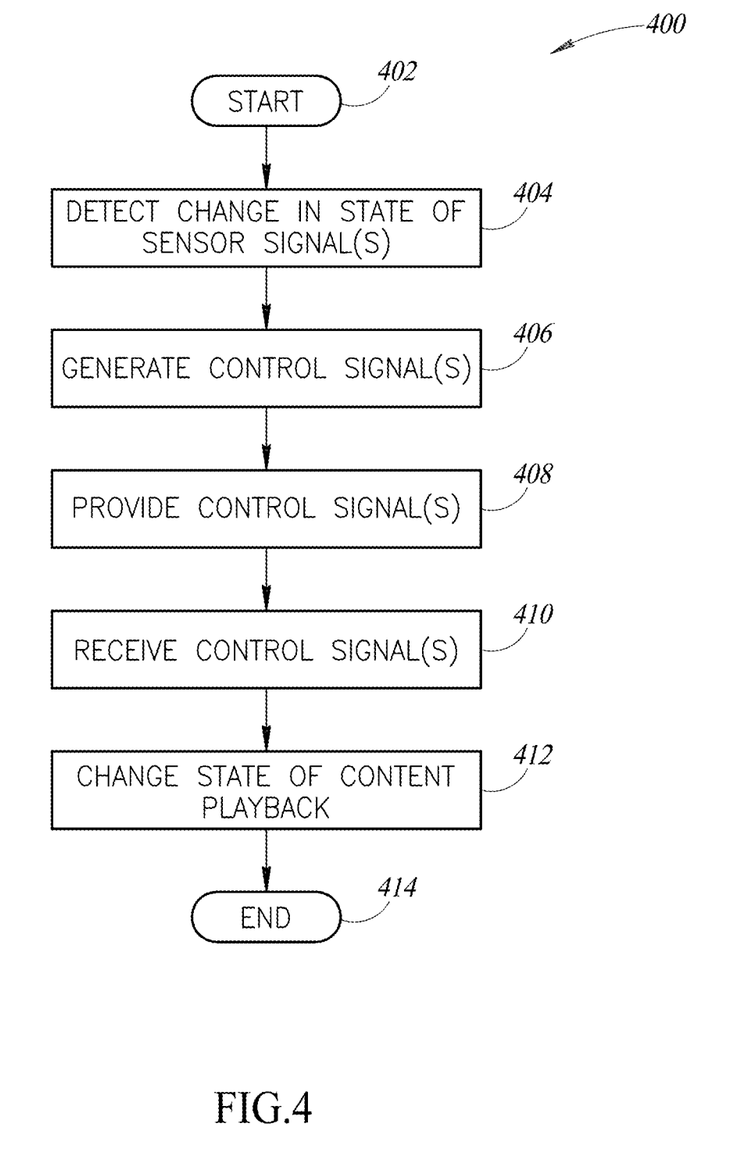
FIG. 4 is a flowchart of a process performed according to one embodiment of the present disclosure.

FIG. 4 is a flowchart 400 illustrating a process performed by a system according to one embodiment of the present disclosure. In one embodiment, the process is performed by the system 100 including the headset 102 and the content playing device 104 shown in FIG. 1. In one embodiment, the process is performed by the system 200 including the headset 202 and the content playing device 204 shown in FIG. 2.

The process begins at 402. At 404, a headset detects at least one change in at least one state of at least one sensor. In one embodiment, at 404, the control circuitry 112 of the headset 102 detects a change in the state of at least one sensor signal provided by at least one of the sensors 110a and 110b. For example, the control circuitry 112 of the headset 102 detects that at least one sensor signal provided by at least one of the sensors 110a and 110b transitions from a high voltage level to a low voltage level, transitions from a low voltage level to a high voltage level, transitions from no signal to a signal, or transitions from a signal to no signal. In one embodiment, at 404, the processing circuitry 216 or the microprocessor 206 of the headset 202 detects a change in the state of at least one sensor signal provided by at least one of the sensors 110a and 110b. For example, the processing circuitry 216 or the microprocessor 206 of the headset 202 detects that at least one sensor signal provided by at least one of the sensors 110a and 110b transitions from a high voltage level to a low voltage level, transitions from a low voltage level to a high voltage level, transitions from no signal to a signal, or transitions from a signal to no signal.

At 406, the headset generates one or more control signals. In one embodiment, the control circuitry 112 of the headset 102 includes an audio tone generator that stops generating a first signal having at least one predetermined characteristic (e.g., frequency, duration, voltage level), and begins generating a second signal having at least one predetermined characteristic (e.g., frequency, duration, voltage level) different from that of the first signal. In one embodiment, the microprocessor 206 of the headset 202 generates a control packet that includes control information or an instruction that, when processed by the content playing device 204, causes the content playing device 204 to un-pause playing of content.

At 408, the headset provides the one or more control signals generated at 406 to a component, for example, that is connected to an external device. In one embodiment, at 408, the control circuitry 112 of the headset 102 provides one or more control signals generated at 406 to at least one connector included in the audio interface 114, which is connected via the audio cable 134 to the content playing device 104. The audio cable 134 provides the one or more control signals to the content playing device 104. In one embodiment, at 408, the microprocessor 206 of the headset 202 provides a control packet generated at 406 to the wireless transceiver 218, which is connected via a wireless connection to the content playing device 204. The wireless transceiver 218 provides the packet to the content playing device 204 via the wireless connection.

At 410, an external device receives the one or more control signals provided at 408. In one embodiment, at 410, the audio interface 130 of the content playing device 104 receives the one or more control signals from the headset 102 via the audio cable 134. In one embodiment, at 410, the processing circuitry 120 of the content playing device 104 receives the one or more control signals from the audio interface 130. In one embodiment, at 410, the microprocessor 122 of the content playing device 104 receives the one or more control signals from the processing circuitry 120.

In one embodiment, at 410, the wireless transceiver 220 of the content playing device 204 receives the one or more control signals from the headset 202 via a wireless connection. In one embodiment, at 410, the processing circuitry 120 receives the one or more control signals from the wireless transceiver 220. In one embodiment, at 410, the microprocessor 122 receives the one or more control signals from the processing circuitry 120 or from the wireless transceiver 220.

At 412, the external device changes a state of content playing. In one embodiment, at 412, the microprocessor 122 of the content playing device 104 provides at least one control signal to the processing circuitry 120, in response to the one or more control signals received at 410. As a result, the processing circuitry 120 resumes outputting a video portion of the content to the display 116 and resumes outputting an audio portion of the content to the audio interface 130.

In one embodiment, at 412, the microprocessor 122 of the content playing device 204 provides at least one control signal to the processing circuitry 120, in response to the one or more control signals received at 410. As a result, the processing circuitry 120 resumes outputting a video portion of the content to the display 116 and resumes outputting audio data corresponding to an audio portion of the content to the microprocessor 122 or to the wireless transceiver 220. The process ends at 414.

Figure 5A:
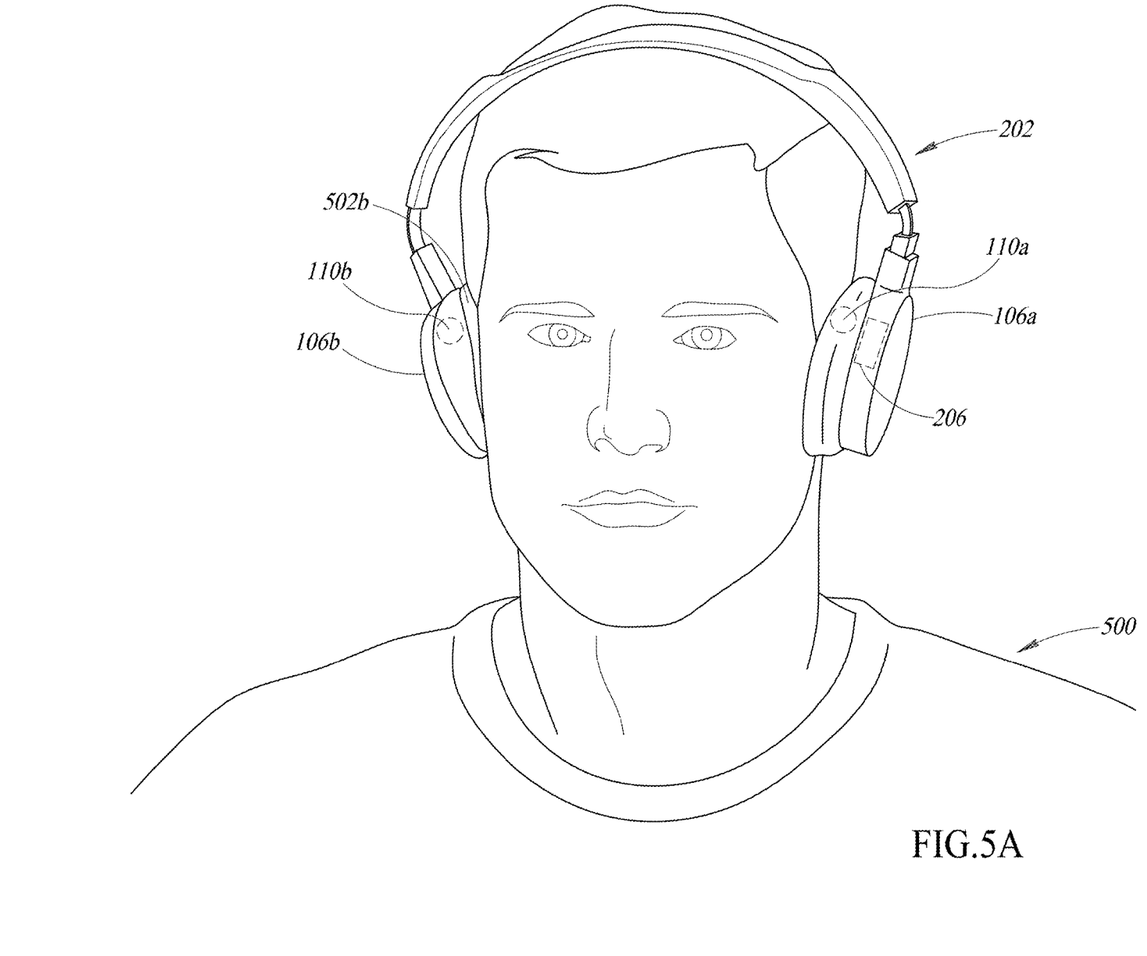
FIGS. 5A-5C show a headset according to one embodiment of the present disclosure.
Figure 5B:
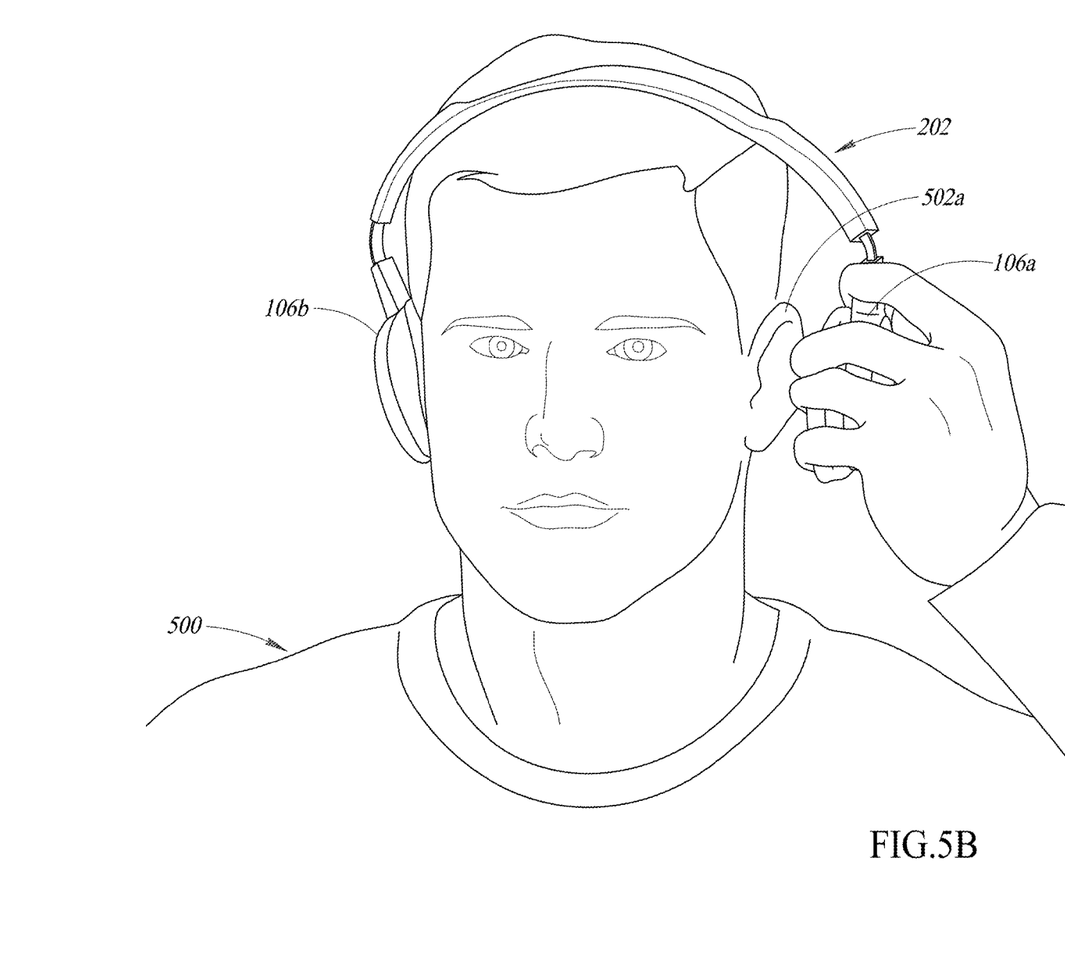
Figure 5C:
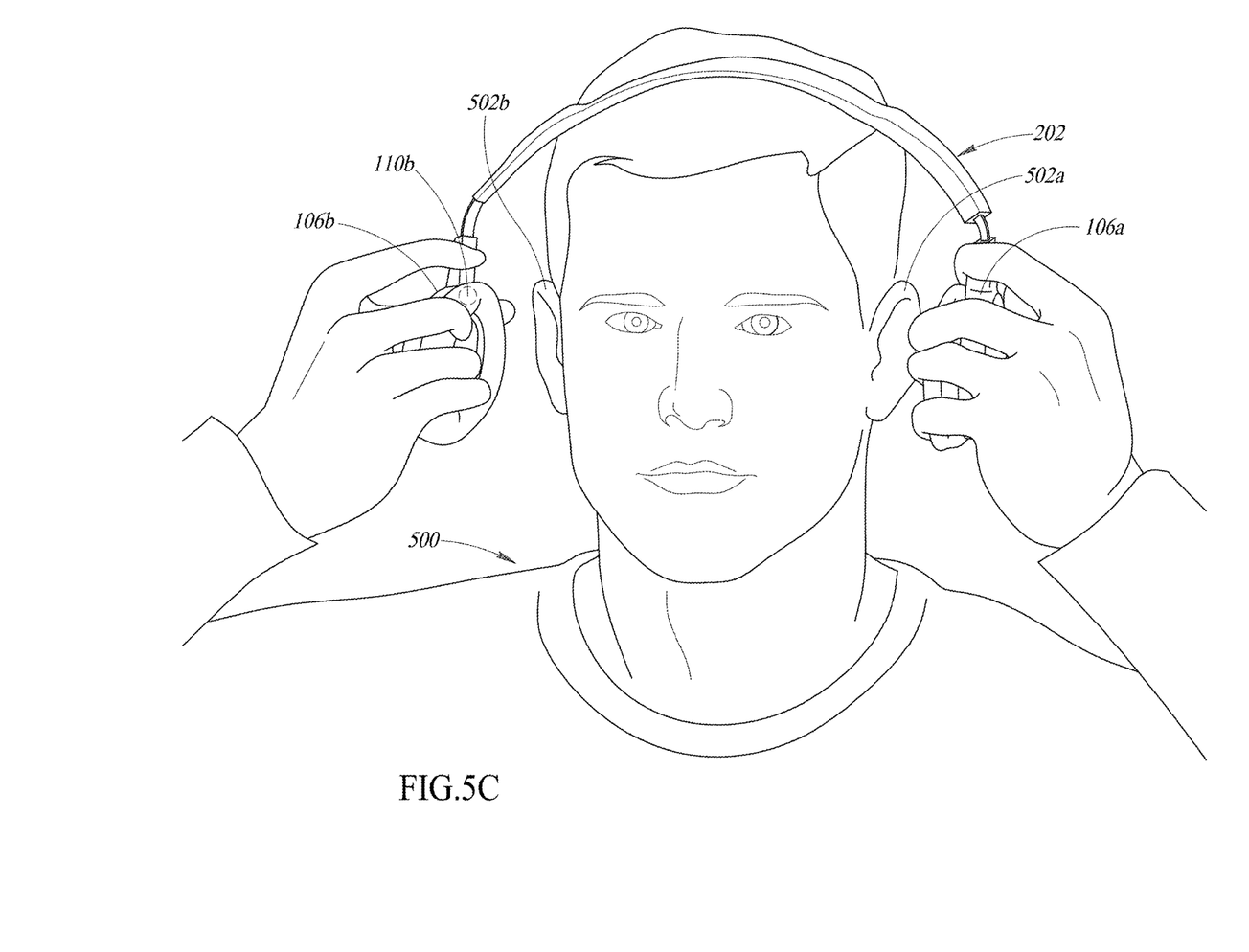

FIGS. 5A-5C show a headset according to one embodiment of the present disclosure. FIG. 5A shows the headset 202 in a first position with respect to a user 500. The earpiece 106a is abutting the head adjacent to the ear or abutting the user's left ear 502a itself. The earpiece 106b is abutting the head adjacent to the ear or abutting the user's right ear 502b. The sensor 110a outputs a sensor signal indicating that the earpiece 106a is abutting the user's left ear 502a, and the sensor 110b outputs a sensor signal indicating that the earpiece 106b is abutting the user's right ear 502b. The microprocessor 206 generates one or more control signals (e.g., packets) that cause content to be played from the content playing 204. As a result, sounds corresponding to an audio portion of the content are emitted from the speakers 108a and 108b (shown in FIG. 2).

FIG. 5B shows the headset 202 in a second position with respect to the user 500. The user 500 may move the headset 202 into the second position when the user 500 is trying to hear sounds in user's environment through the user's left ear 502a. The earpiece 106a is not abutting the user's left ear 502a and the earpiece 106b is abutting the user's right ear 502b. The sensor 110a outputs a sensor signal indicating that the earpiece 106a is not abutting the user's left ear 502a, and the sensor 110b outputs a sensor signal indicating that the earpiece 106b is abutting the user's right ear 502b. The microprocessor 206 generates one or more command signals that cause sound to not be emitted from the speaker 108a.

For example, the processing circuitry 216, includes switches (not shown) through which signals from the microprocessor 206 pass before being provided to the speakers 108a and 108b. If the microprocessor 206 determines that only the sensor 110b is outputting a sensor signal indicating that the headset 202 is near the user 500, the processing circuitry 216 provides a control signal that causes one of the switches to open so that sound is no longer emitted from the speaker 108a.

In this particular embodiment, the sound which is coming out of headset 106a is muted by turning off the signal going to speaker 108a. However, the playing of the content still continues and the sound is emitted from earpiece 106b.

In this embodiment, the user is able to move the headset off of one ear so that he can hear the surrounding environment with one ear, but can also listen to the playing content with the other ear and, thus, not miss anything. This is particularly beneficial if it is a live broadcast and the user is listening to an important live event, such as a sporting event, a live concert or other presentation.

In an alternative embodiment, a program is set up to terminate all playing if either earpiece is removed from abutting adjacent to the ear. For example, in the alternative embodiment, if one earpiece is removed from being adjacent to the ear as shown in FIG. 5B, then the playing of all content stops in both earpieces 106a and 106b. This embodiment permits the user to pause all playing and terminate all output merely by removing one of the headsets from adjacent his ear. Accordingly, the user can then apply his full concentration to the new project at hand. Once the project at hand has been completed, the user can put the one earpiece back adjacent to his ear and thereafter can have the playing content resume at its prior position. Thus, in this embodiment, the removal of just one earpiece causes the entire playing to pause rather than merely mute the sound out of one of the earpieces.

FIG. 5C shows the headset 202 in a third position with respect to the user 500. The user 500 may move the headset 202 into the third position as the user 500 is removing the headset 202. The earpiece 106a is not abutting the user's left ear 502a and the earpiece 106b is not abutting the user's right ear 502b. The sensor 110a outputs a sensor signal indicating that the earpiece 106a is not abutting the user's left ear 502a, and the sensor 110b outputs a sensor signal indicating that the earpiece 106b is not abutting the user's right ear 502b. The microprocessor 206 generates one or more command signals that cause sounds to not be emitted from the speakers 108a and 108b.

For example, the processing circuitry 216, includes switches (not shown) through which signals from the microprocessor 206 pass before being provided to the speakers 108a and 108b. When the microprocessor 206 determines that both of the sensors 110a and 110b are outputting sensor signals indicating that the earpieces 106a and 106b are not near the user's left ear 502a and right ear 502b, respectively, the processing circuitry 216 provides a control signal that causes both of the switches to open so that sound is no longer emitted from the speakers 108a and 108b. Additionally or alternatively, when the microprocessor 206 determines that both of the sensors 110a and 110b are outputting sensor signals indicating that the earpieces 106a and 106b are not near the user's left ear 502a and right ear 502b, respectively, the processing circuitry 216 generates a control signal (e.g., packet) that is provided to the content playing device 204, which causes the content playing device 204 to pause playing of content.

After the user 500 puts the headset 202 back on, as shown in FIG. 5A, the sensor 110a outputs a sensor signal indicating that the earpiece 106a is abutting the user's left ear 502a, and the sensor 110b outputs a sensor signal indicating that the earpiece 106b is abutting the user's right ear 502b. The microprocessor 206 generates one or more command signals that cause sounds to be emitted from the speakers 108a and 108b.

For example, the processing circuitry 216, includes switches (not shown) through which signals from the microprocessor 206 pass before being provided to the speakers 108a and 108b. When the microprocessor 206 determines that both of the sensors 110a and 110b are outputting sensor signals indicating that the earpieces 106a and 106b are near the user's left ear 502a and right ear 502b, respectively, the microprocessor 206 or the processing circuitry 216 provides one or more control signals that cause both of the switches to close so that sound is emitted from both of the speakers 106a and 106b. Additionally or alternatively, when the microprocessor 206 determines that both of the sensors 110a and 110b are outputting sensor signals indicating that the earpieces 106a and 106b are near the user's left ear 502a and right ear 502b, respectively, the processing circuitry 216 generates a control signal (e.g., packet) that is provided to the content playing device 204, which causes the content playing device 204 to un-pause playing of content.

Figure 6:
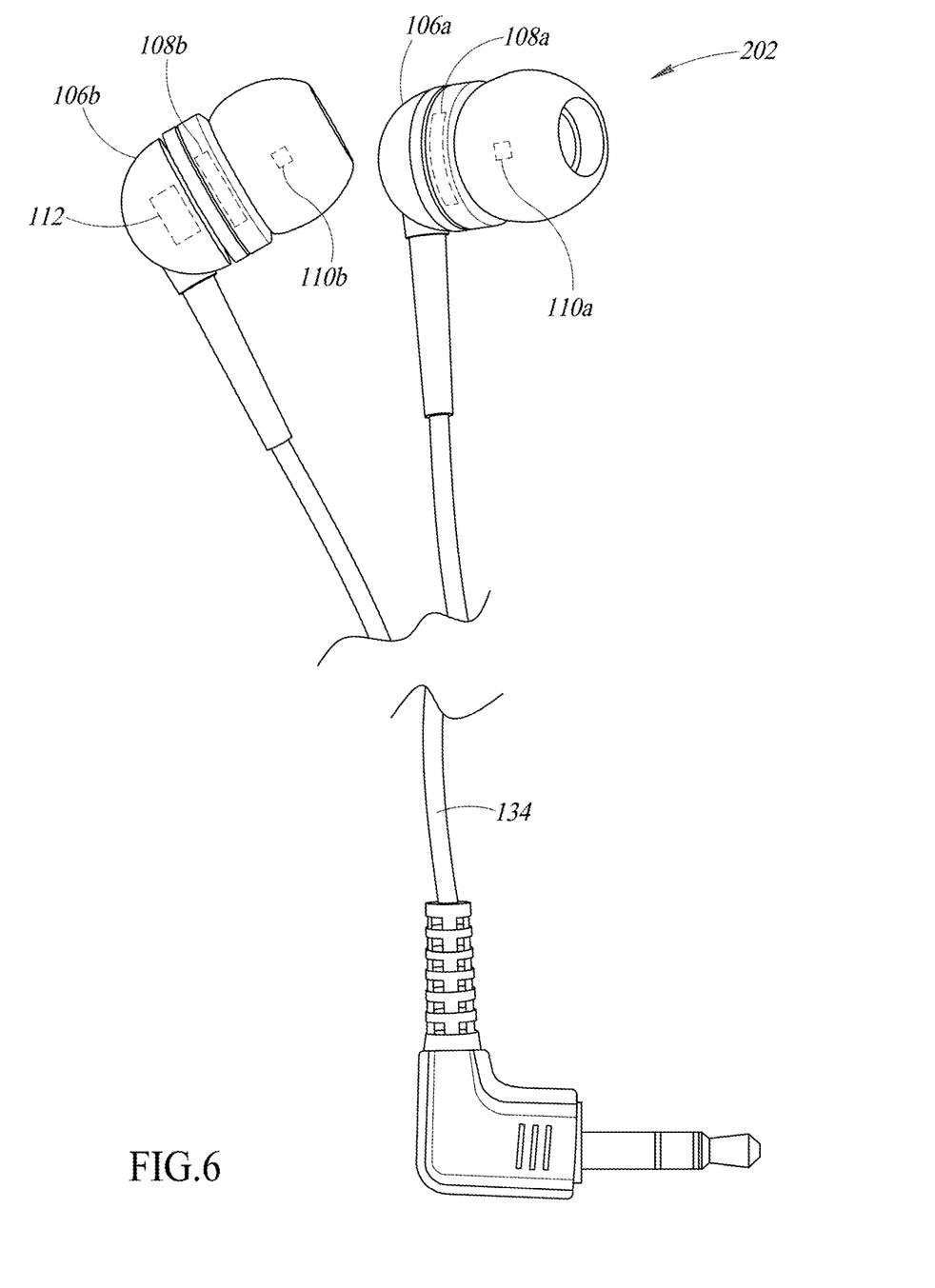
FIG. 6 shows a headset according to one embodiment of the present disclosure.

FIG. 6 shows the headset 102 according to one embodiment of the present disclosure. Each of the earpieces 106a and 106b is of an earbud type, and can be at least partially inserted into an ear of a user. The speaker 108a and the sensor 110a are coupled to the earpiece 106a. The sensor 110a is configured to detect whether the earpiece 106a is at least partially inserted into an ear of a user. The sensor 110a outputs a first signal when the earpiece 106a is at least partially inserted into the ear of the user and outputs a second signal when the earpiece 106a is not at least partially inserted into the ear of the user. Similarly, the speaker 108b and the sensor 110b are coupled to the earpiece 106b. The sensor 110b is configured to detect whether the earpiece 106b is at least partially inserted into an ear of a user. The sensor 110b outputs a first signal when the earpiece 106b is at least partially inserted into the ear of the user and outputs a second signal when the earpiece 106b is not at least partially inserted into the ear of the user. For earpieces 106a and 106b which are of the earbud type, a low cost, simple pressure sensor is beneficial for use of the sensor 110. The sensor 110, being a simple pressure sensor, will indicate whether or not it is compressed by being placed in a person's ear. If some level of pressure is not applied, then this will be taken as an indication that the earpiece is not within the person's ear and the signal output will be to either mute or pause the playing of the content. The control circuitry 112 outputs via the audio cable 134 one or more control signals based on the sensor signals output from the sensors 110a and 110b, which cause the content playing device 104 to pause or un-pause playing of content.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling playing of content from a device coupled to a headset, the method comprising:
    detecting whether at least one earpiece of the headset is abutting a person's head adjacent to one ear of a person;
    responsive to detecting that the at least one earpiece of the headset is abutting the person's head, generating a first control signal configured to cause the device to permit playing of the content;
    providing the first control signal to the device;
    responsive to receiving the first control signal, permitting the playing of the content;
    responsive to detecting that the at least one earpiece of the headset is not abutting the person's head, generating a second control signal configured to cause the device to permit pausing of the content;
    providing the second control signal to the device;
    responsive to receiving the second control signal, permitting the pausing of the content;
    detecting a sound having at least one predetermined characteristic in the environment in which the headset is located; and
    responsive to detecting the sound having the at least one predetermined characteristic in the environment in which the headset is located, generating at least one control signal that causes the device to pause playing of the content.

2. The method of claim 1 wherein
detecting whether the at least one earpiece of the headset is abutting the person's head includes:
    detecting whether a first earpiece of the headset is abutting the person's head adjacent to a first ear of the person, and
    detecting whether a second earpiece of the headset is abutting the person's head adjacent to a second ear of the person, and
responsive to detecting that the at least one earpiece of the headset is abutting the person's head, generating a first control signal configured to cause the device to permit the playing of the content includes:
    responsive to detecting that the first earpiece of the headset is abutting the person's head and that the second earpiece of the headset is abutting the person's head, generating the first control signal configured to cause the device to permit playing of the content.

3. The method of claim 2, further comprising:
    responsive to detecting that the first earpiece of the headset is not abutting the person's head adjacent to the first ear of the person and that the second earpiece of the headset is abutting the person's head adjacent to the second ear of the person, muting a first speaker coupled to the first earpiece; and responsive to detecting that the first earpiece of the headset is abutting the person's head adjacent to the first ear of the person and that the second earpiece of the headset is not abutting the person's head adjacent to the second ear of the person, muting a second speaker coupled to the second earpiece.

4. The method of claim 1 wherein providing the first control signal to the device includes providing the first control signal to at least one connector of an audio interface of the headset, and proving the second control signal to the device includes providing the second control signal to at least one connector of the audio interface of the headset.

5. The method of claim 1 wherein providing the first control signal to the device includes wirelessly transmitting the first control signal to the device, and proving the second control signal to the device includes wirelessly transmitting the second control signal to the device.

6. The method of claim 1, further comprising:

generating audio data corresponding to the sound;

converting the audio data into first text data; and comparing the first text data to second text data, wherein detecting the occurrence of the event in the environment in which the headset is located is in response to determining that the first text data at least partially matches the second text data.

7. A headset, comprising:

at least one earpiece;

at least one speaker coupled to the at least one earpiece;

at least one sensor, which in operation, detects whether the at least one earpiece is abutting at least one ear of a person and outputs at least one sensor signal indicating whether the at least one earpiece is abutting the at least one ear of the person;

an audio sensor, which in operation, outputs to the control circuitry an audio signal corresponding to at least one sound in an environment in which the audio sensor is located; and control circuitry, which in operation, receives the at least one sensor signal from the at least one sensor and causes at least one control signal to be provided to an external device responsive to detecting at least one change in a state of the at least one sensor signal from the at least one sensor, the at least one control signal configured to cause the external device to terminate playing of content, wherein the control circuitry, in operation, provides to the external device a control signal configured to cause the external device to pause playing of content based on a state of the audio signal, and wherein the control circuitry, in operation, determines whether the audio signal has at least one predetermined characteristic and causes the control signal configured to cause the external device to pause playing of content to be provided to the external device responsive to determining that the audio signal has the at least one predetermined characteristic.

8. The headset of claim 7 wherein the control circuitry, in operation, causes the at least one speaker to be muted responsive to detecting the at least one change in the state of the at least one sensor signal from the at least one sensor.

9. The headset of claim 7 wherein the at least one control signal is configured to pause playing of the content.

10. The headset of claim 7 wherein the at least one earpiece includes a first earpiece and a second earpiece, the at least one speaker includes a first speaker coupled to the first earpiece and a second speaker coupled to the second earpiece, the at least one sensor includes:

a first sensor, which in operation, outputs a first sensor signal indicating whether the first earpiece is abutting a first ear of the person, and a second sensor, which in operation, outputs a second sensor signal indicating whether the second earpiece is abutting a second ear of the person, the control circuitry, in operation, generates a first control signal configured to cause the external device to pause playing of content responsive to receiving both the first sensor signal indicating that the first earpiece is not abutting the first ear of the person and the second sensor signal indicating that the second earpiece is not abutting the second ear of the person, and the control circuitry, in operation, generates a second control signal configured to cause the external device to un-pause the playing of content responsive to receiving both the first sensor signal indicating that the first earpiece is abutting the first ear of the person and the second sensor signal indicating that the second earpiece is abutting the second ear of the person.

11. The headset of claim 7 wherein the at least one earpiece includes a first earpiece and a second earpiece, the at least one speaker includes a first speaker coupled to the first earpiece and a second speaker coupled to the second earpiece, the at least one sensor includes:

a first sensor, which in operation, outputs a first sensor signal indicating whether the first earpiece is abutting a first ear of the person, and a second sensor, which in operation, outputs a second sensor signal indicating whether the second earpiece is abutting a second ear of the person, the control circuitry, in operation, causes the first speaker to be muted responsive to receiving the first sensor signal indicating that the first earpiece is not abutting the first ear of the person and the second sensor signal indicating that the second earpiece is abutting the second ear of the person, and the control circuitry, in operation, causes the second speaker to be muted responsive to receiving the first sensor signal indicating that the first earpiece is abutting the first ear of the person and the second sensor signal indicating that the second earpiece is not abutting the second ear of the person.

12. The headset of claim 11 wherein the control circuitry, in operation, causes the first speaker to be un-muted responsive to receiving the first sensor signal indicating that the first earpiece is abutting the first ear of the person and the second sensor signal indicating that the second earpiece is abutting the second ear of the person, and the control circuitry, in operation, causes the second speaker to be un-muted responsive to receiving the first sensor signal indicating that the first earpiece is abutting the first ear of the person and the second sensor signal indicating that the second earpiece is abutting the second ear of the person.

13. The headset of claim 7, further comprising an audio interface including a plurality connectors, wherein the control circuitry, in operation, causes the at least one control signal to be provided to at least one of the connectors of the audio interface.

14. The headset of claim 7, further comprising a wireless transceiver, wherein the control circuitry, in operation, causes the wireless transceiver to transmit the at least one control signal to the external device.

15. A headset, comprising:
- at least one earpiece;
- at least one speaker coupled to the at least one earpiece;
- at least one sensor, which in operation, detects whether the at least one earpiece is abutting at least one ear of a person and outputs at least one sensor signal indicating whether the at least one earpiece is abutting the at least one ear of the person;
- an audio sensor, which in operation, outputs to the control circuitry an audio signal corresponding to at least one sound in an environment in which the audio sensor is located; and
- control circuitry, which in operation, receives the at least one sensor signal from the at least one sensor and causes at least one control signal to be provided to an external device responsive to detecting at least one change in a state of the at least one sensor signal from the at least one sensor, the at least one control signal configured to cause the external device to terminate playing of content, wherein the control circuitry, in operation, provides to the external device a control signal configured to cause the external device to pause playing of content based on a state of the audio signal, and wherein the control circuitry, in operation, converts the audio signal into first text data, compares the first text data to second text data, and causes the control signal configured to cause the external device to pause playing of content to be provided to the external device responsive to determining that the first text data at least partially matches the second text data.

* * * * *